Dec. 22, 1925.  
J. W. AULD  
PLASTERER'S FLOAT  
Filed June 16, 1923    2 Sheets-Sheet 1
1,566,515
Fig.1.
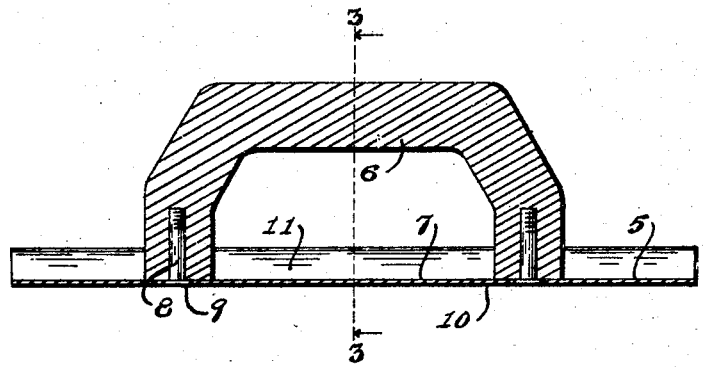
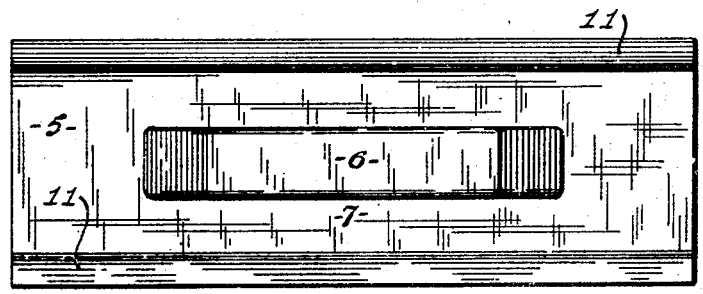
Fig.2.
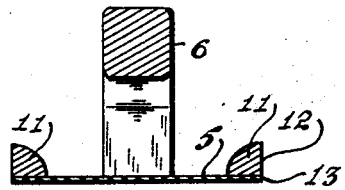
Fig.3.
John W. Auld.  
INVENTOR  
BY  
ATTORNEY

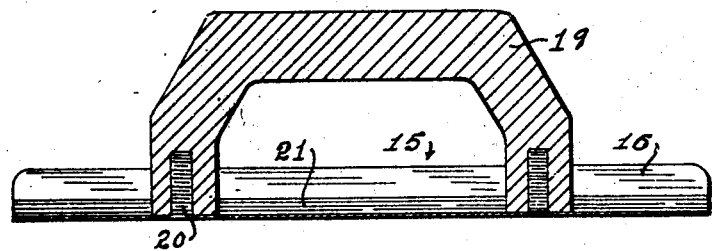
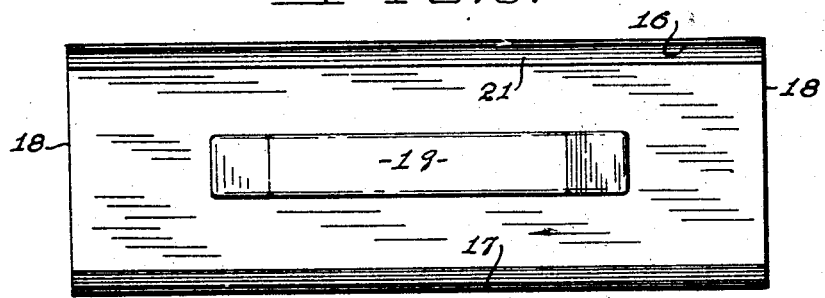
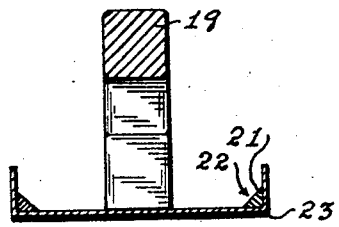

Patented Dec. 22, 1925.

1,566,515

UNITED STATES PATENT OFFICE.

JOHN W. AULD, OF LOS ANGELES, CALIFORNIA.

PLASTERER'S FLOAT.

Application filed June 16, 1923. Serial No. 645,887.

*To all whom it may concern:*

Be it known that I, JOHN W. AULD, a citizen of the United States, and a resident of Huntington Park, Los Angeles, in the county of Los Angeles and State of California, have invented new and useful Improvements in Plasterers' Floats, of which the following is a specification.

This invention relates to plasterers' floats and has for its principal object the provision of a light weight and inexpensive float which will give longer and better service.

It will be understood in the consideration of this invention that all floats are required to present sharp unbroken edges in order to accomplish their purpose efficiently, but are ordinarily constructed of wood, and the wood wears rapidly, particularly when the plaster used is at all abrasive, and as soon as the edges and corners become all rounded or blunt the float has lost its efficiency.

It is therefore an object of my invention to provide a float adapted for manufacture at low first cost which will present square unbroken edges and which will not tend to wear as rapidly as wood floats.

It is also important that a float be as light in weight as possible, and yet of sufficiently rigid construction that it does not warp. It is therefore another object of my invention to provide a lightweight float which will not absorb moisture and which is constructed to reduce tendency of warping.

Another object of the invention is to provide a float that will present an extremely smooth lower surface which will not tend to accumulate dirt or other foreign matter.

Still other objects and advantages will appear hereinafter and will be better understood by virtue of the order of occurrence in the specification.

I have illustrated by the accompanying drawings a preferred embodiment of my invention, and it is conceived that numerous other embodiments of my invention may suggest themselves to the minds of those skilled in the art, and I do not limit myself to any specific construction or arrangement of parts, but may employ any construction or arrangement of parts as desired or occasion requires, within the appended claim.

In the drawings,

Figure 1 is a view in vertical section of the said embodiment.

Figure 2 is a plan view thereof, and

Figure 3 is a view in section seen on a line 3—3 of Fig. 1.

Figure 4 is a view in vertical section of a modified form of the invention.

Figure 5 is a plan view thereof, and

Figure 6 is a vertical cross section thereof.

More specifically, in carrying out my invention I employ a rectangular blank 5 of sheet metal of sufficient thickness to give rigidity but as light weight as possible. I have found that aluminum is preferable to give light weight, and by virtue of its comparatively low friction coefficient, particularly over moist plaster and finishes, it is conducive to particularly efficient and neat work.

I provide a usual handle 6, which may be constructed of metal or wood, which may be suitably secured to the upper surface 7 of the blank of metal. Any suitable fastening means may be employed, and in the embodiment shown I use a soft metal rivet 8 which extends up into the wooden handle, while its lower end is spun out, as at 9, to present a smooth surface in alignment with the under surface 10 of the metal. Thus while the handle is efficiently secured, the working surface of the metal is smooth and unbroken.

Obviously, while a float constructed as above described, is light in weight, it must be reenforced against distortion, and for this purpose I employ a pair of longitudinally extending reenforcing elements 11—11. Said elements are preferably made of wood, and ordinarily I use what is known as "quarter round" stock, which is suitably secured to the metal. This "quarter round" provides maximum rigidity with light weight and inexpensive construction. This stock also provides for a vertically rising edge 12 at right angle to the metal. By providing such an edge at each side, the plaster being surfaced is prevented from accumulating on the metal blade and the same effect and advantages of a thick wooden float are realized.

It will be seen, however, that the wood stock is not depended upon for giving true square edges to the float, but rather, the metal is depended upon for this, since all edges, such as 13 are necessarily square and true.

In use, the metal edges will not tend to wear rapidly, and withal, the float is sufficiently rigid for all practical purposes, and extremely light in weight, while possessing longer wearing qualities.

In the form of the invention illustrated in Figs. 4, 5 and 6, a blank 15, of sheet metal is employed, which, by virtue of its improved construction I am about to describe, may be of comparatively light gauge. The metal blank is formed so that two opposed parallel upright sides 16 and 17 are provided. These sides extend longitudinally of the blank, while the ends 18—18 are left unbent.

To the blank so formed a handle 19 is attached as in the previously described form of the invention; screws 20 being employed. Now it will be apparent that a float constructed as illustrated will be light in weight, and even when expensive metal is employed the cost will be moderate. While the upturned sides will tend to reenforce the float, I provide means for further reenforcing the float and for adding any desired degree of weight. Said means is indicated in the drawings by numeral 21, and consists in a small quantity of metal of a low melting point, such as solder or Babbitt metal, which is poured into space 22 while the float is tilted at an angle of 45 degrees.

It will be seen now, particularly by reference to Fig. 6, that this form of the invention provides a well balanced float, of low first cost, which presents sharp working edges 23, while its weight may be added to as desired. Obviously, the thinner the blank the sharper the edge 23 will be, without the necessity of drawing the metal when the blank is shaped and without any grinding or machining whatsoever.

Having described and illustrated two preferred forms of my invention in such a manner that those skilled in the art would be enabled to make and use same,

I claim:—

In a plasterer's float, a rectangular sheet of metal having square cut parallel side edges, two strips of wood; one for each of said side edges and each strip having a flat bottom surface and a substantially smooth vertically ranging surface intersecting the said bottom surface to provide a defined substantially right angle corner; each of the said strips attached to the smooth upper surface of said sheet of metal with its vertically ranging surface in vertical alignment with the corresponding square cut edge.

JOHN W. AULD.